(12) United States Patent
Dingler et al.

(10) Patent No.: US 8,070,226 B2
(45) Date of Patent: Dec. 6, 2011

(54) INFANT CAR SEAT BASE

(75) Inventors: Noah Dingler, Phoenixville, PA (US);
Jason Arnold, Philadelphia, PA (US);
Craig Weber, Philadelphia, PA (US)

(73) Assignee: Graco Children's Products Inc., Atlanta, GA (US)

( * ) Notice: Subject to any disclaimer, the term of this patent is extended or adjusted under 35 U.S.C. 154(b) by 303 days.

(21) Appl. No.: 12/410,408

(22) Filed: Mar. 24, 2009

(65) Prior Publication Data

US 2010/0244519 A1    Sep. 30, 2010

(51) Int. Cl.
*B60N 2/28* (2006.01)
*A47D 1/00* (2006.01)

(52) U.S. Cl. ............. 297/256.11; 297/250.1; 297/256.1; 297/256.16

(58) Field of Classification Search ............... 297/250.1, 297/256.1, 256.11, 256.16, 256.13
See application file for complete search history.

(56) References Cited

U.S. PATENT DOCUMENTS

| | | | |
|---|---|---|---|
| 5,160,185 A | 11/1992 | Stang | |
| 5,836,650 A | 11/1998 | Warner, Jr. et al. | |
| 6,017,088 A | 1/2000 | Stephens et al. | |
| 6,139,101 A * | 10/2000 | Berringer et al. | 297/256.1 |
| 6,170,911 B1 | 1/2001 | Kassai et al. | |
| 6,299,249 B1 | 10/2001 | Mori | |
| 6,347,832 B2 | 2/2002 | Mori | |
| 6,428,099 B1 * | 8/2002 | Kain | 297/256.1 |
| 6,554,358 B2 * | 4/2003 | Kain | 297/256.13 |
| 6,561,582 B1 | 5/2003 | Steadman | |
| 6,817,665 B2 * | 11/2004 | Pacella et al. | 297/250.1 |
| 7,207,628 B2 * | 4/2007 | Eros | 297/297 |

(Continued)

FOREIGN PATENT DOCUMENTS

DE    198 26 575    12/1998

(Continued)

OTHER PUBLICATIONS

Office Action in German patent application No. 10 2010 012 093.6-16, dated Oct. 19, 2010, 5 pages.

(Continued)

*Primary Examiner* — David Dunn
*Assistant Examiner* — Philip Gabler
(74) *Attorney, Agent, or Firm* — Lempia Summerfield Katz LLC

(57) ABSTRACT

An infant car seat base assembly has a base section with a top side, a bottom side, an upright base panel on a first end, and first and second openings vertically spaced apart on the upright base panel. A foot is attached to the first end and is slidable along the upright base panel in a direction generally normal to a plane of the bottom side between a first position and a second position. The foot has a foot body and a resilient, flexible leg extending up from the foot body. The flexible leg is exposed on an exterior of the base section and has a back side facing the upright base panel. The foot has a guide leg extending up from the foot body adjacent the flexible leg and positioned behind the upright base panel. A tab protrudes from the back side of the flexible leg and is sized to selectively seat in each of the first and second openings. The flexible leg biases the tab toward the upright base panel to seat in a selected one of the first and second openings when aligned therewith. The flexible leg can be bent outward away from the upright base panel to permit sliding the foot to one of the first or second positions.

20 Claims, 12 Drawing Sheets

U.S. PATENT DOCUMENTS

| | | | |
|---|---|---|---|
| 2004/0245822 A1* | 12/2004 | Balensiefer et al. | 297/250.1 |
| 2005/0151402 A1 | 7/2005 | Balensiefer et al. | |
| 2006/0138825 A1 | 6/2006 | Eros | |

FOREIGN PATENT DOCUMENTS

| | | |
|---|---|---|
| DE | 601 05 796 | 11/2005 |
| EP | 1 435 308 | 7/2004 |
| EP | 1 591 307 | 10/2009 |
| GB | 2 342 854 | 4/2000 |

OTHER PUBLICATIONS

Owner's Manual for Graco SafeSeat™ (Step 1 car seat base), Published 2005.

Owner's Manual for Graco Infant Restraint/Carrier (SnugRide® car seat base), Published 2007.

Search and Examination Report issued in corresponding Great Britain application No. 1004907.0 mailed Jul. 21, 2010.

* cited by examiner

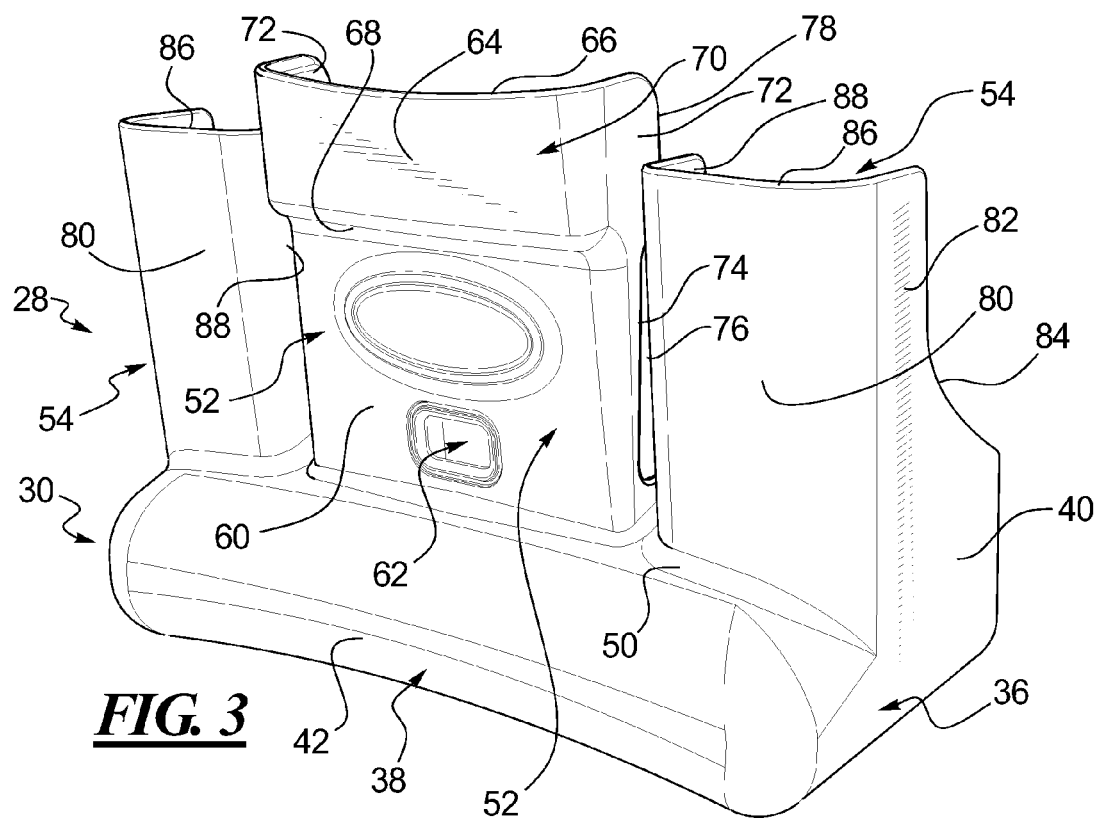

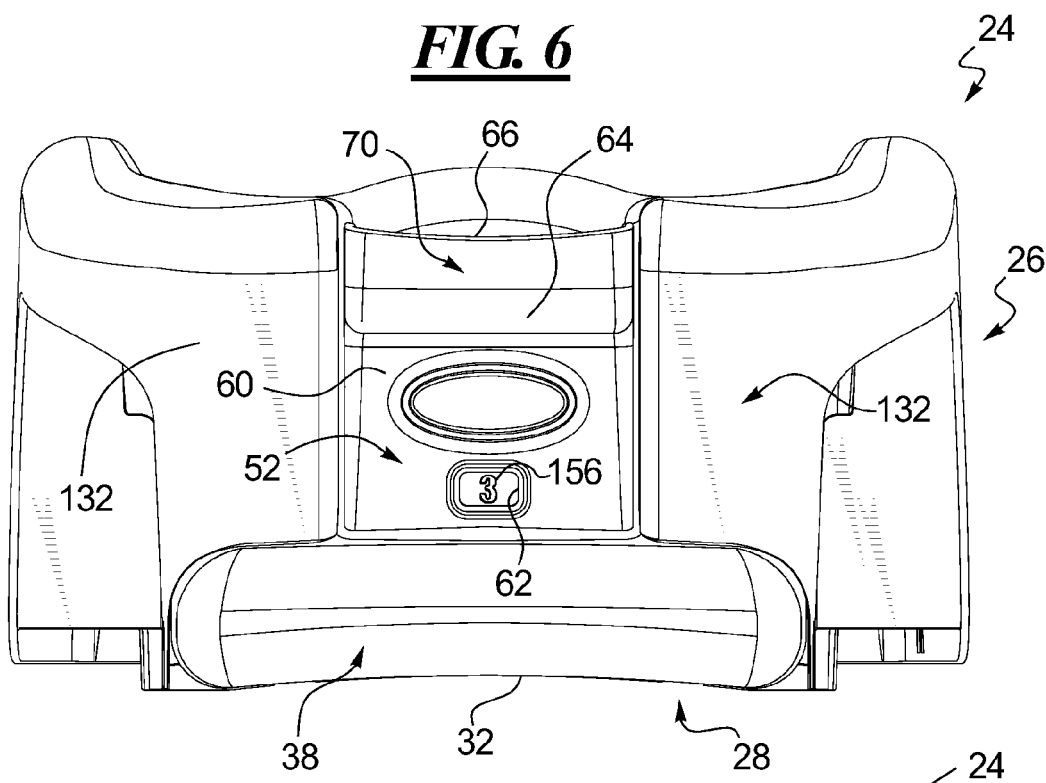
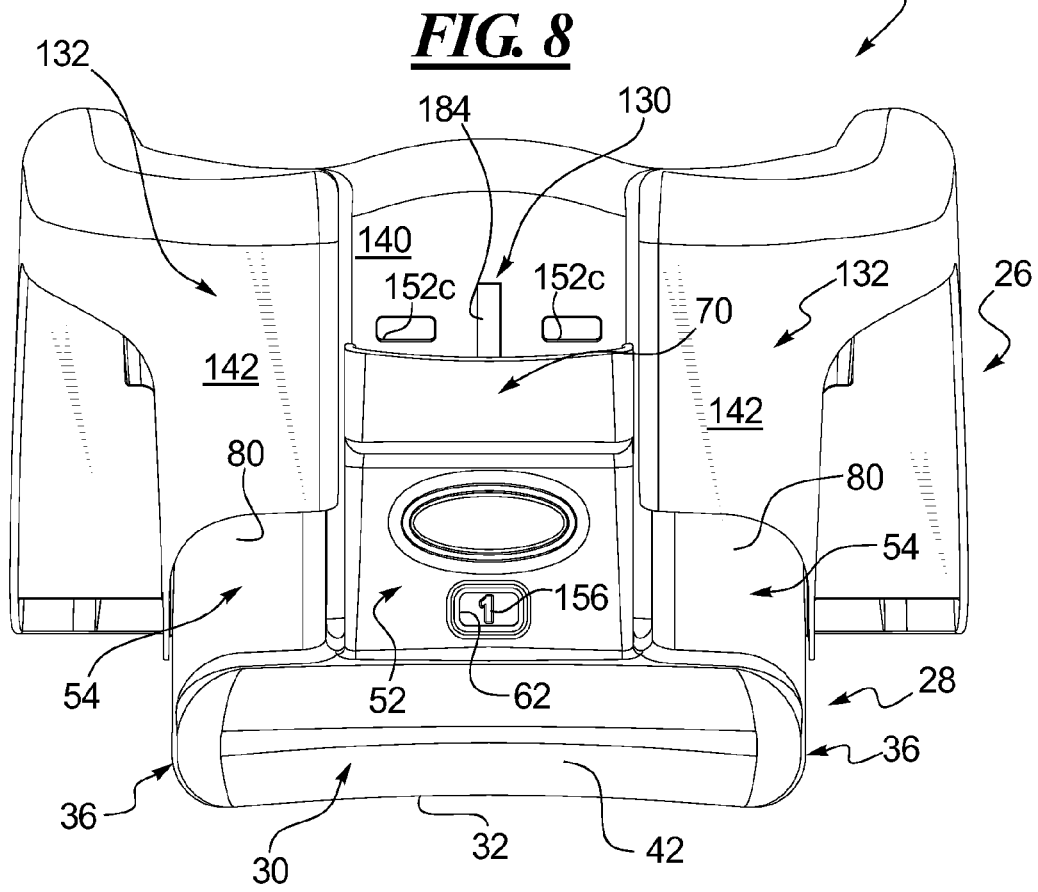

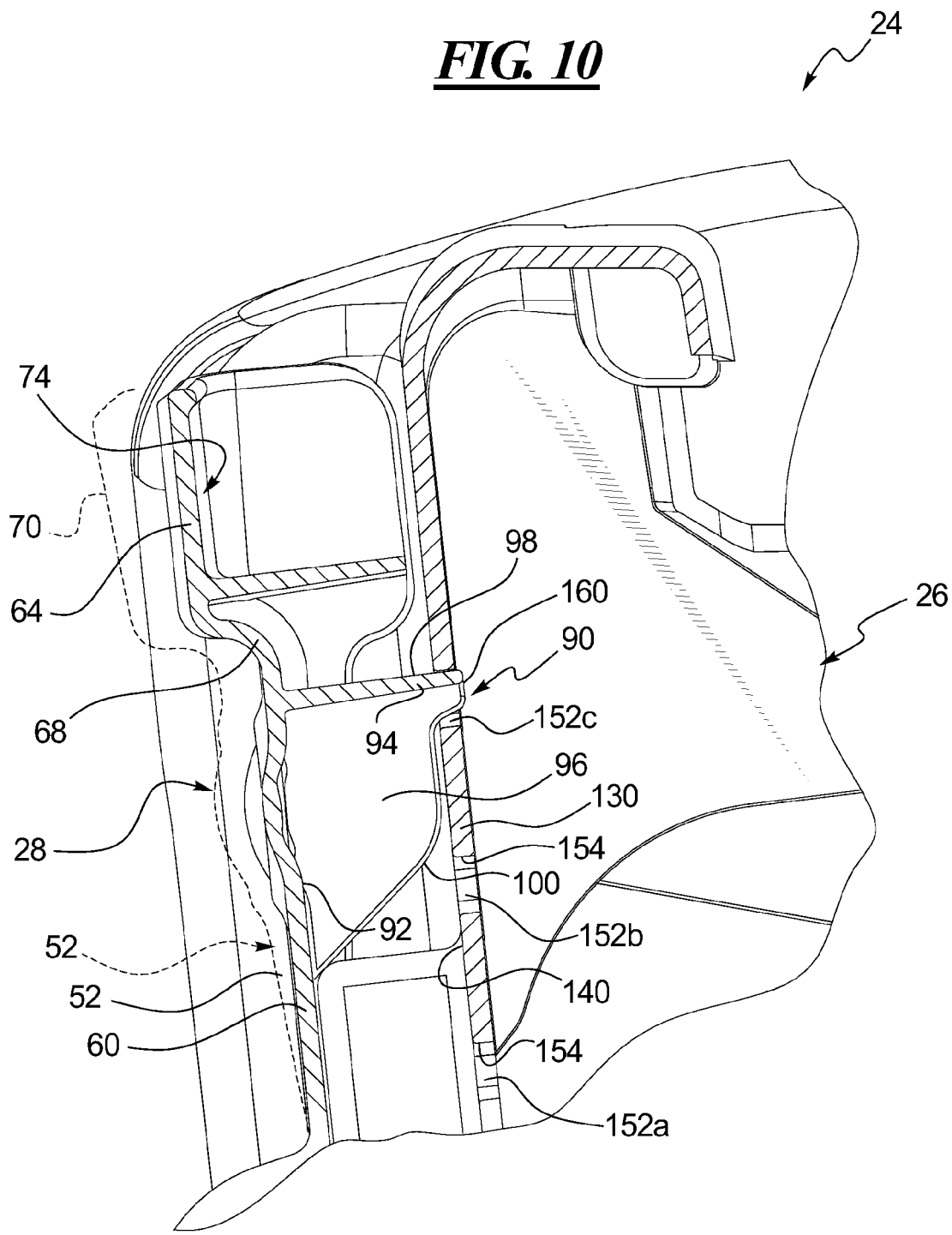

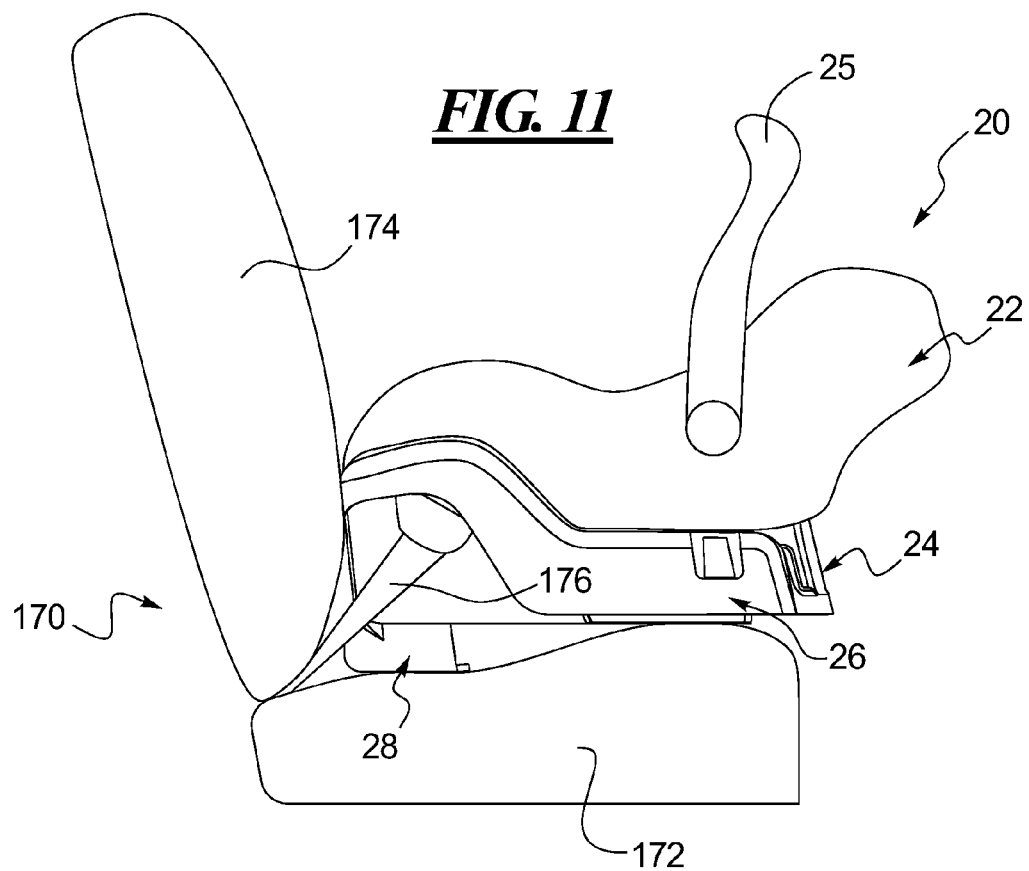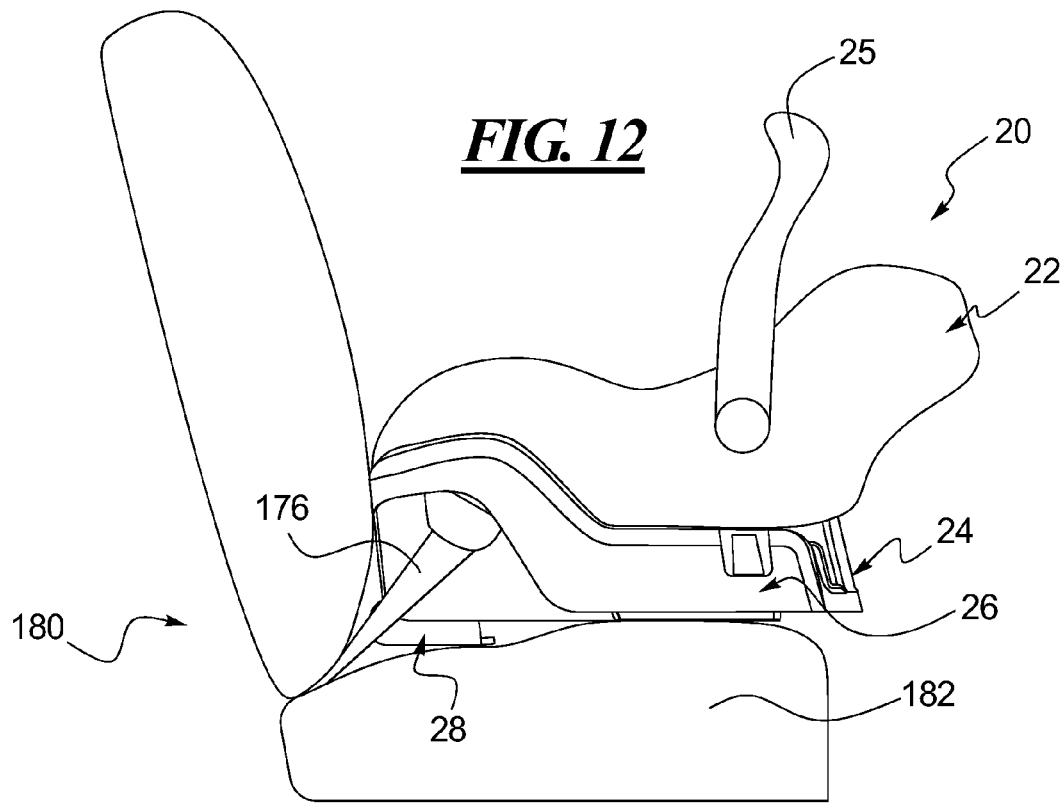

INFANT CAR SEAT BASE

BACKGROUND

1. Field of the Disclosure

The present invention is generally directed to infant car seats, and more particularly to an infant car seat base assembly that has a height adjustable foot.

2. Description of Related Art

Infant car seats are known in the art and used to securely and more safely transport infants in moving vehicles. Many infant car seat products have a base that is positioned on the vehicle seat and an infant car seat that is removably attachable to the base. It is desirable for both safety and comfort of the seat occupant to have the infant car seat properly oriented or inclined during use.

It is known in the art for these types of infant car seats to adjust the height of the base at one end. For earlier known products, the incline or recline of the infant car seat could be adjusted by placing a rolled up blanket, towel, or some other article under one end of the car seat base on top of the vehicle seat and then maneuvering the article until the desired attitude or incline of the base was achieved. This practice was inconvenient and awkward and could sometimes result in the infant car seat not being properly inclined for optimum comfort and/or safety.

More recently, a number of infant car seats have been produced that incorporate an on-board adjustment mechanism. The mechanism can typically be manipulated to adjust the car seat base incline or elevation relative to the vehicle seat on which it is installed. The typical adjustment mechanism for such a car seat and base employs some type of column or leg at a front portion of the base (front corresponding to the foot end of the infant car seat). The height of the column or leg relative to the car seat base can be selectively adjusted to change the tilt angle of the base relative to the vehicle seat on which it is installed.

Most of these types of adjustable mechanisms include multiple components and/or require two hands to adjust the mechanism height relative to the base. In one example, GRACO's "Step 1" infant car seat has a base that employs a three-part screw mechanism. A user must rotate an actuator in one direction or the other in order to raise or lower the mechanism height relative to the base. The GRACO "Step 1" mechanism requires only one hand to adjust the height, but the mechanism has multiple parts, which must each be manufactured and assembled in addition to the base. Thus, the cost and complexity of this solution can be relatively high.

In another example, GRACO's "SnugRide" infant car seat has a base that employs a one-piece adjustable mechanism. The "SnugRide" base has a one-piece plastic foot one the inside of the base with a part that projects out from the base bottom and that can be positionally adjusted relative to the base. The plastic foot has a pair of hooked tabs that project out from the base through openings on the base. These tabs hold the foot in a selected height position. In order to adjust the height of the foot, a user must use two hands to push both of the tabs in at the same time and then force the foot up or down to the selected height position. This procedure can be relatively difficult to do, and particularly when the base is installed on a vehicle seat. The user may need one hand to push both tabs in at the same time and the other hand to move the foot. Sometimes the user needs two hands just to push in the tabs, making it difficult to then also move the foot, as the tabs are resiliently biased to extend out through the openings. Also, if the base is pressed against a vehicle's seat back during use, the tabs can be inadvertently pushed inward and the foot can potentially and inadvertently be dislodged from a selected position, altering the base incline. Thus, though this solution employs a one-piece mechanism, two hands are required to manipulate the mechanism and the mechanism can inadvertently move during use.

SUMMARY

A base assembly is disclosed and described herein for an infant car seat. The base assembly in one example has a base section with a top side, a bottom side, an upright base panel on a first end, and first and second openings vertically spaced apart on the upright base panel. A foot is attached to the first end and is slidable along the upright base panel in a direction generally normal to a plane of the bottom side between a first position and a second position. The foot has a foot body and a resilient, flexible leg extending up from the foot body. The flexible leg is exposed on an exterior of the base section and has a back side facing the upright base panel. A guide leg extends up from the foot body adjacent the flexible leg and is positioned behind the upright base panel. A tab protrudes from the back side of the flexible leg and is sized to selectively seat in each of the first and second openings. The flexible leg biases the tab toward the upright base panel to seat in a selected one of the first and second openings when aligned therewith. The flexible leg can be bent outward away from the upright base panel to permit sliding the foot to one of the first or second positions.

In one example, the base assembly can have a handle positioned at an upper end of the flexible leg and have a finger access between the upright base panel and the flexible leg.

In one example, the flexible leg can have a front panel joined to the body, a top edge, and an upper panel section extending up from the front panel and terminating at the top edge. The upper panel section can be arranged out of plane with the front panel further from the upright base panel. The finger access can thus be provided between the upright base panel and the upper panel section.

In one example, the base assembly can have a pair of standoffs projecting rearward from side edges of the flexible leg toward the upright base panel. This can create a finger access between the upright base panel and an upper edge of the flexible leg.

In one example, the base assembly can have a pair of the tabs laterally spaced apart from one another on the flexible leg.

In one example, the base assembly can have two sets of the first and second openings. The two sets can be laterally spaced apart from one another on the upright base panel. Each of the two sets can be positioned to receive a respective one of the pair of tabs.

In one example, the base assembly can include one or more additional openings vertically spaced apart between the first and second openings. In one example, the base assembly can have two or more such openings.

In one example, the base assembly can have two of the guide legs with one positioned on each side of the flexible leg, and can have a gap between each of the two guide legs and the flexible leg. A portion of the upright base panel can be positioned behind the flexible leg, a portion of the upright base panel can be positioned within each gap, and a portion of the upright base panel can be positioned in front of each of the two guide legs.

In one example, the base assembly can have two of the guide legs, one positioned on each side of the flexible leg, and can have two upwardly open channels positioned behind the upright base panel, each sized to receive one of the two guide legs.

In one example, the base assembly can have a window formed through the flexible leg and indicia provided on the upright base panel corresponding to each of the first and second openings. The indicia for one of the first and second openings can be visible through the window when the tab is seated in the corresponding opening.

In one example, the tab can have a stop surface that faces upward and bears against an edge of a selected one of the first and second openings when seated therein. The tab can also have a ramped surface facing in a direction opposite the stop surface.

In one example, the upright base panel can be a front wall on a front end of the base section.

In one example, the guide leg can be disposed behind of the front wall beneath the base section.

In one example, the base assembly can have stop mechanism including a slot on one of the base section and the foot. The slot can have a length defined by opposed stop surfaces. The stop mechanism can also have a stop finger projecting from the other of the base section and the foot. The stop finger can be captured in and slidable along the slot such that the stop finger contacts one of the opposed stop surfaces if the foot is moved beyond the first position in a direction away from the second position and contacts the other of the opposed stop surfaces if the foot is moved beyond the second position in a direction away from the first position.

An infant car seat product in one example has a base with a top side, a bottom side, an upright base wall on one end of the base, and two openings vertically spaced apart on the upright base wall. An infant car seat is detachably mountable to the top side of the base. A foot is slidable up and down along the upright base wall between two positions. The foot has a foot body and a resilient, flexible leg integral with and extending up from the foot body. The flexible leg is exposed on an exterior of the base adjacent the upright base wall. The flexible leg has an upper edge spaced from the upright base wall. A guide leg is integral with and extends up from the foot body adjacent the flexible leg and is positioned behind the upright base wall. A tab protrudes from the flexible leg and is sized to selectively seat in each of the two openings and having a stop surface. The flexible leg normally seats the tab in a selected one of the two openings when the tab is aligned therewith. The stop surface bears against an edge of the selected opening when seated therein and prevents upward sliding of the foot. The upper edge of the flexible leg can be pulled outward away from the upright base wall to unseat the tab and permit sliding the foot to either of the two positions.

In one example, the tab can have a ramped surface facing in a direction opposite the stop surface. The ramped surface can permit downward sliding of the foot without manually pulling on the upper edge of the flexible leg.

In one example, the infant car seat product can have two of the tabs and two laterally spaced apart sets of the two openings. Each tab can be positioned so as to align with the two openings of one of the two sets of the two openings.

In one example, the infant car seat product can have one or more additional openings vertically spaced apart between the two openings on the upright base wall. Each of the openings can correspond to a different foot position. In one example, the infant car seat can have two or more such openings.

In one example, the infant car seat product can have a pair of the guide legs, one guide leg positioned on each side of and spaced from the flexible leg. The product can also have a pair of upwardly open channels positioned behind the upright base wall, each channel sized to slidably receive one of the pair of guide legs.

BRIEF DESCRIPTION OF THE DRAWINGS

Objects, features, and advantages of the present invention will become apparent upon reading the following description in conjunction with the drawing figures, in which:

FIG. 3 shows a front perspective view of the adjustable foot for the base assembly in FIG. 2.

FIG. 4 shows a rear perspective view of the adjustable foot in FIG. 3.

FIG. 6 shows a front view of the base assembly in FIGS. 1 and 2 with the adjustable foot in a retracted position.

FIG. 8 shows a front view of the base assembly in FIG. 6 with the adjustable foot in an extended position.

FIG. 10 shows a cross-section of a catch portion for the adjustable foot of the base assembly taken along line X-X in FIG. 6.

FIG. 11 shows the infant car seat product in FIG. 1 installed on a vehicle seat in a rear facing orientation and with the adjustable foot in a fully extended position.

FIG. 12 shows the infant car seat product in FIG. 11, but with the adjustable foot in a mid-height position between the fully retracted and fully extended positions.

DETAILED DESCRIPTION OF THE DISCLOSURE

The disclosed infant car seat base assembly solves or improves upon one or more of the above noted and/or other disadvantages and problems with known infant car seats and bases. The disclosed base assembly has a seat base and an adjustable foot positioned at one end of the base. The foot is a one-piece simple structure that is vertically moveable relative to that end of the base. The adjustable foot can be manipulated with only one hand by a user. In addition, the adjustable foot remains engaged and seated in a selected position when an object such as a vehicle seat pushes inward toward the one end of the base. A single hand hold or handle is provided on the foot on an exterior of the base that a user can pull to release the foot for vertical positional adjustment. Thus, the disclosed adjustable foot can be operated with only one hand, and when installed on a vehicle seat, the positional adjustment of the foot will be retained even if the seat base is pressed against the seat back of the vehicle during use. The disclosed adjustable foot is a simple one-piece design that can be attached to the base without use of any tools. Thus, the manufacture and assembly of the parts and the use of the base assembly disclosed herein are simpler, less expensive, and easier to manufacture and assemble, and use than prior known base assemblies with adjustment capabilities.

Figure 1:
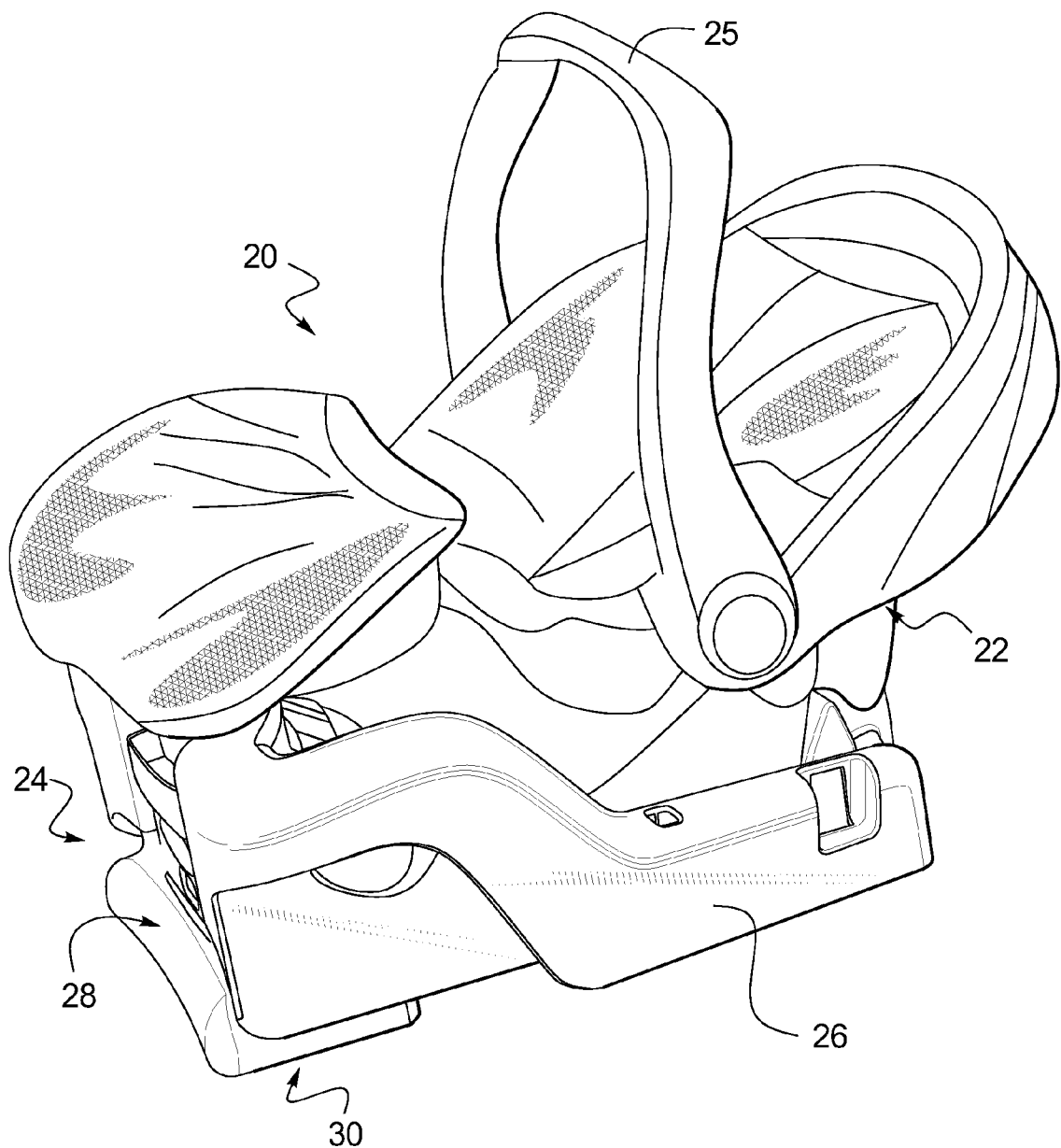
FIG. 1 shows a perspective view of one example of an infant car seat product constructed in accordance with the teachings of the present invention.

Turning now to the drawing, FIG. 1 shows one example of an infant car seat product 20 constructed in accordance with the teachings of the present invention. In this example, the assembled product generally includes an infant car seat (ICS) 22 and a base assembly 24. The ICS 22 can vary in configuration and construction and is not intended in any way to limit the scope of the present invention. As is known in the art, the ICS 22 can be attached to and removed from a top side of the base assembly 24 so that the ICS can be used separate from the base assembly. The ICS 22 has a handle 25 by which a caregiver can lift the ICS off the base assembly and carry the seat for separate use.

Figure 2:
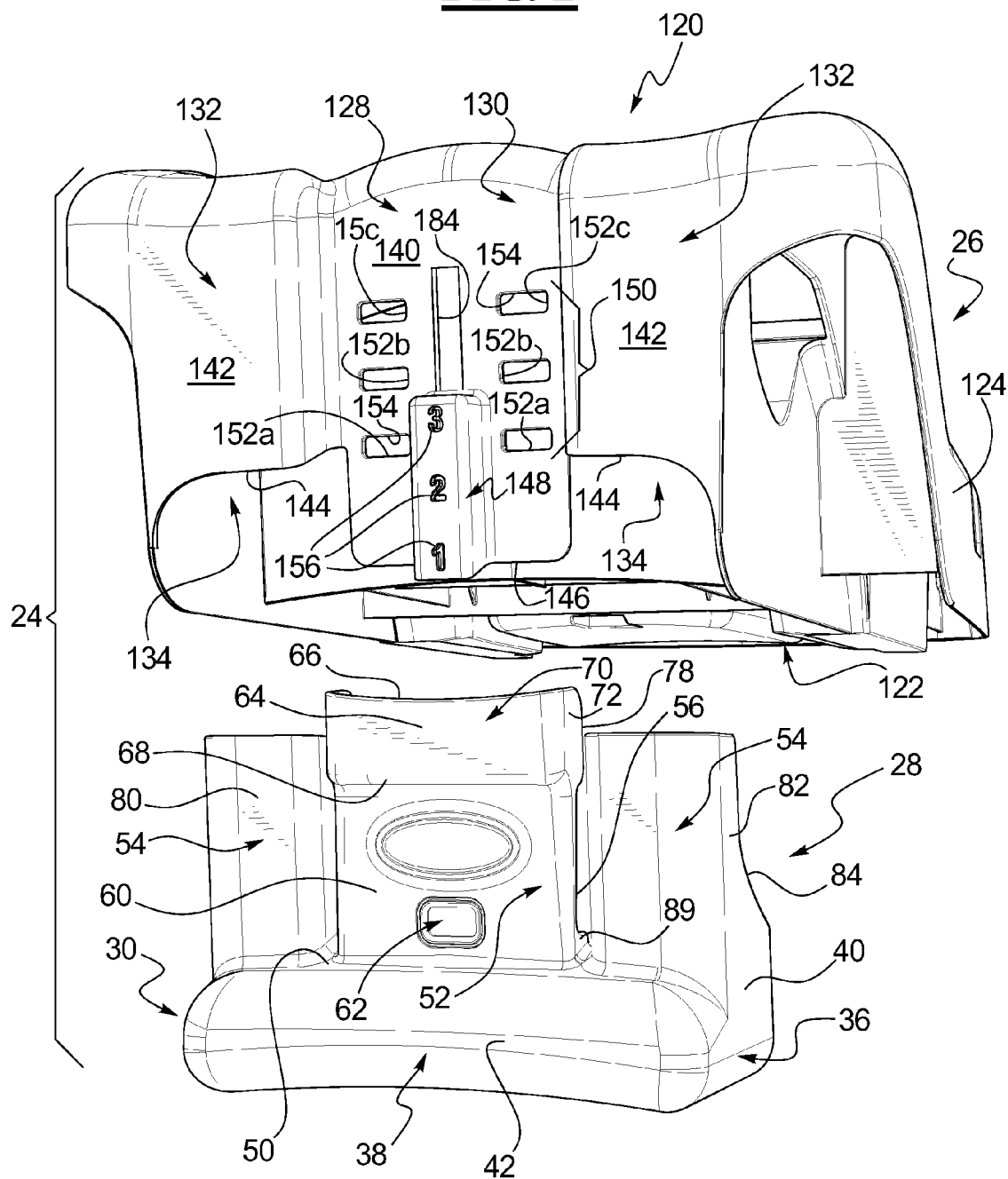
FIG. 2 shows an exploded front view of the base assembly of the infant car seat product in FIG. 1.

With reference to FIGS. 1 and 2, the base assembly 24 in this example generally has two primary components of interest. Essentially, the base assembly 24 including a base section or base 26 and a foot 28 of a one-piece construction. The foot 28 is positionally adjustable relative to the base 26, as will be described in greater detail below.

With reference to FIGS. 2-4, the one-piece adjustable foot 28 in this example has a foot body 30 with a sole or bottom 32. The bottom 32 of the body 30 has a rear edge 34 at an open rear or heel end. The body 30 also has a pair of opposed sides 36 and a front toe end 38. The foot 28 has a side wall 40 on each side 36 that integrally extends up from a side edge on each side of the bottom 32. The toe or front end 38 has a front face 42 that integrally extends up from a forward edge of the bottom 32. The front face 42 in this example is rounded or curved, but could be flat or otherwise shaped differently without departing from the scope of the invention. Similarly, the lower portions of the side wall 40 are also curved transitioning from the bottom 32. The shape and configuration of the various regions of the side walls of very and scope of the invention.

In the disclosed example, the front face 42 continues rearward integrally into the side walls 40 as can be seen in FIG. 3. The bottom 32, side walls 40, and front face 42 combine to form a somewhat rounded but box-like structure for the foot body 28. As illustrated, the foot body 30 is hollow on the rear side as shown in FIG. 4 and is smoothly contoured in this example as shown in FIG. 3. A plurality of ribs or other structural elements can be formed on the foot 28 to provide structural rigidity and integrity to the foot during use. In this example, the exterior surfaces of the foot body are generally smooth and contoured, but could have ribs, ridges, depressions, and the like to beef up the structure. In this example, a number of ribs 44 are shown in FIG. 4 on the interior of the foot body 30. These ribs can be separately manufactured and later attached to the foot 28 or integrally molded as part of the foot body 30. In this example, the rim and 44 extend from the total and 38 to the rear edge 34 and are connected to the interior surfaces of the bottom 32 and front face 42.

With further reference to FIGS. 2-4, the foot 28 has an upper structure extending up from a top of the front face 42 on the toe or front end 38. The upper wall structure has three segments, each of which is attached integrally to a ledge 50 on the top of the toe or front end 38. The upper wall structure has a flexible leg 52 flanked in this example by a pair of adjacent guide legs 54. The flexible leg 52 and guide legs 54 are separated by small gaps 56 or spaces that extend up from the ledge 50. In an alternate embodiment, the upper wall structure could employ only one flexible leg and one guide leg or two flexible legs flanking a central guide leg within the scope of the invention.

In this example, the flexible leg 52 has a thin profile and a generally rectangular frontal shape with a substantial width and height, although the shape and configuration can vary. The flexible leg 52 has a generally planer lower panel section 60 with a window or opening 62 formed therethrough. The flexible leg 52 has an upper panel section 64 located above the lower panel section 60. The upper panel section 64 lies out of plane and spaced forward from a plane of the lower panel section 60. Thus, the upper panel section 64 protrudes further forward over the toe end 38 of the foot 28. The upper panel section 64 terminates at a top edge 66 of the flexible leg 52. The upper panel section 64 extends from the top edge 66 downward to a smooth transition region 68 between the upper and lower panel sections.

In this example, the upper panel section 64 creates a handle 70, i.e., a handhold or grip, on the top end of the flexible leg 52. The sides of the handle 70 on each side of the upper panel section 64 curve rearward, similar to the plane orientation of the side walls 40. These sides have a rearward depth sufficient to create standoffs 72 for the handle. The standoffs can bear against a surface of the base to define the minimum gap between the handle 70 and the base during use. The sides of the lower panel section 60 below the upper panel section 64 also begin to curve rearward and create curved side surfaces 74 on the flexible leg 52. The side surfaces 74 terminate at a free edge 76 and do not extend as far rearward as the free edge 78 of the standoffs 72.

Each of the guide legs 54 is generally U-shaped in a cross-section taken horizontally. Each guide leg 54 has a front 80 generally parallel with the panel sections 60, 64 of the flexible leg 52. Each guide leg 54 also has an outer side 82, which in this example are formed as an upper continuation of the side walls 40 on the foot body 30. As shown in FIGS. 2-4, the outer sides 82 terminate at a rear edge 84. In this example, the rear edges 84 are angled such that the outer sides 82 become gradually narrower (i.e., extend less rearward) moving closer to a top edge 86 of each guide leg 54. The relatively significant depth of the outer sides 82 on the guide legs adds rigidity and stiffness to the guide legs 52.

An inner edge facing the flexible leg 52 on each guide leg 54 is curved rearward, but has a shallow depth to create a lip 88 adjacent the respective gap 56. A rib 89 at the bottom of each gap 56 projects deeper rearward than the lip 88 and essentially defines the bottom of each gap. Each rib 89 on one side of the gap transitions upward into one of the lips 88. Each rib 89 transitions as a continuation of the lip 88 around the bottom of the respective gap 56 and, on the other side of the gap, up into the side surfaces 74 on the flexible leg 52. The combination of the rib 89 and lip 88 adjacent each gap 56 creates a strengthening structure where the guide legs 54 meet and join to the foot body 30 at the ledge 50. The depth of the ribs 89 dissipates quickly as the ribs transition into the side surfaces 74 of the flexible leg 52 near the bottom of the gaps 56. Thus, the ribs 89 can provide some strength at the joint between the flexible leg 52 and the foot body 30 but also permit some bending of the flexible leg for reasons described below.

As shown in FIG. 4, a plurality of additional ribs, walls, and buttresses 88 can be provided interconnecting interior surfaces of the guide legs 54 and the foot body 30 in this example to provide further structural rigidity to the overall foot 28 structure. As will be evident to those having ordinary skill in the art, the configuration and construction of the foot components can vary and yet fall within the spirit and scope of the present invention. The various dimensions, contours, and structural aspects of the guide legs 53, foot body 30, and flexible leg 52 can be varied from the disclosed example. The foot 28 can be less hollow and more enclosed, if desired. The foot print defined by the bottom 32 can also vary considerably. In this example, the foot print is rather large to provide a stable resting surface for the base and foot.

As shown in FIG. 4, a pair of tabs 90 projects rearward from a back side 92 of the flexible leg 52. In this example, the tabs 90 are positioned below the transition 68. Each of these tabs 90 has a depth extending rearward from the back side 92 and is a generally inverted U-shaped structure when viewed from the back of the foot 28. Each tab 90 generally has a horizontal portion 94 projecting somewhat normal or perpendicular from the back side 92. Each tab 90 also has a pair of spaced apart vertical portions 96 extending downward from opposite edges of horizontal portion 94. The horizontal portion 94 has a top side that creates a stop surface 98 or bearing or load surface on each of the tabs 90. Each vertical portion terminates at a free edge 100, is somewhat triangular in shape, and becomes shorter and shorter moving away from the horizontal portion as can be seen in FIG. 4. The vertical portions 96 provide a buttressing function to support and hold the stop surfaces 98 and take and distribute the load placed upon the tabs during use.

With reference again to FIG. 4, the tabs 90 are spaced laterally a part on the back side 92 of the flexible leg 52 in this example. As will become evident to those having ordinary skill in the art, the present invention can be constructed with a single tab or more than two tabs and yet function as intended. Having two spaced apart tabs assists in creating additional stability when the foot is engaged during use. However, it is conceivable that a single wider tab could be utilized or that three or more tabs can also be utilized. The tab or supporting structure that cooperates with the base to retain the foot in a selected position can also vary from the tab configuration shown.

Figure 5:
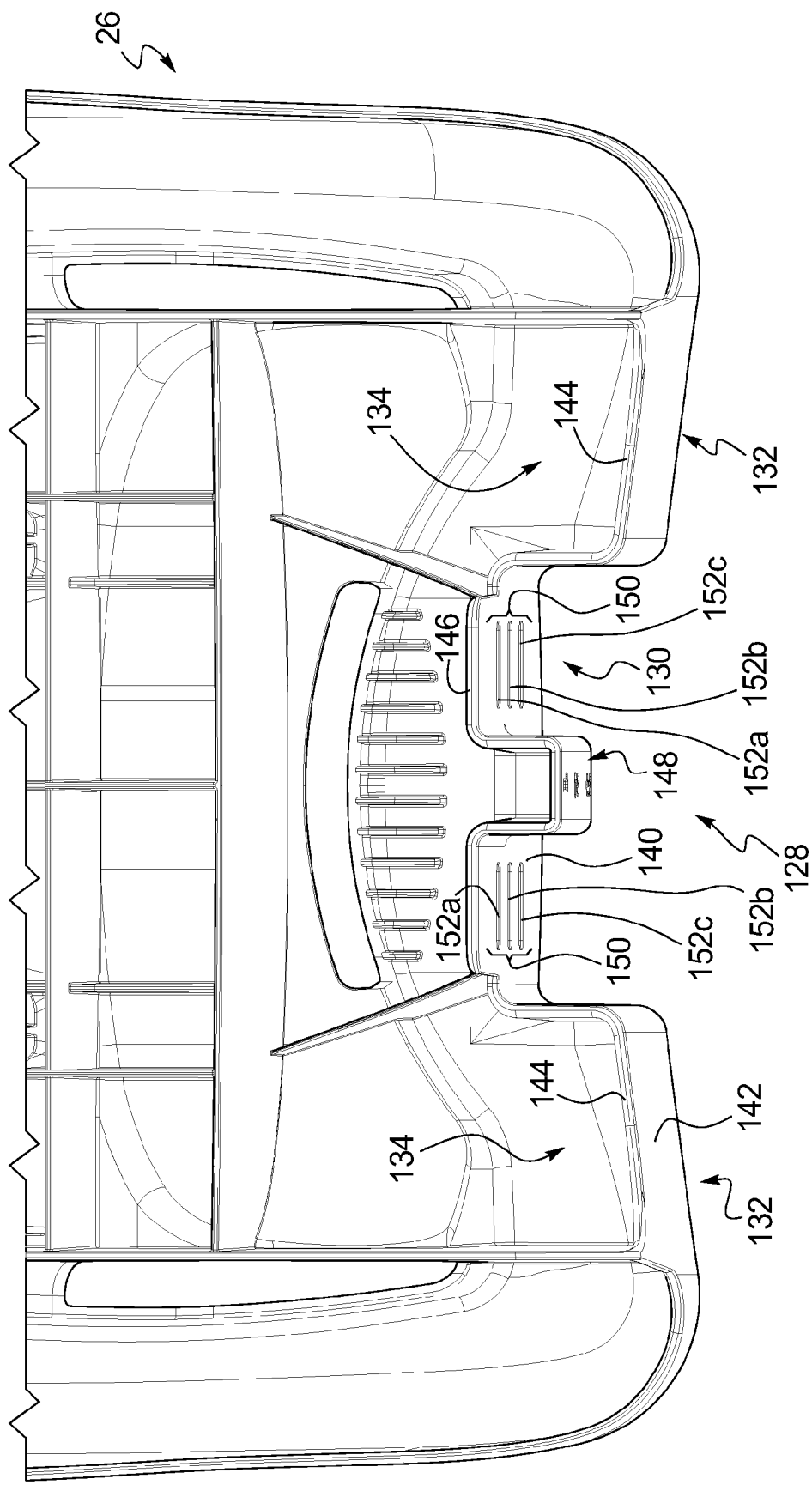
FIG. 5 shows a bottom view of part of the base section for the base assembly in FIG. 2.

As shown in FIGS. 2 and 5, the base 26 can be a molded plastic structure with complex shapes and contours to accept and mounted the ICS 22, as well as to accommodate other design and performance considerations. As will be evident to those having ordinary skill in the art, the various features of the base 26, including its shape, size, structure, and contours can vary considerably within the spirit and scope of the present invention and yet function as intended. The end of the base 26 to which the foot 28 is attached is the area on the base that is of concern in this application. Thus, the one end of the base 26 is the only portion of the base described in any detail herein.

With reference to FIGS. 1, 2, and 5, the base section or base 26 generally has a top side 120, a bottom side 122, and a perimeter side wall 124. A portion of the side wall 124 in this example defines an upright base panel 128 on one end of the base 26. In this example, the one end of the base is a front end, which coincides with a foot end of the ICS 22 (i.e., the end where an infant's feet would rest when seated). In this example, the upright base panel 128 is an integral part of the perimeter side wall 124. However, the upright base panel 128 need not be a part of the side wall but instead could be another structure added to the side wall or replacing a portion thereof.

As shown in FIG. 5, the bottom side of the base 26 has a generally hollow configuration with a plurality of ribs and trusses molded within to create a sturdy structure. The upright base panel 128 in this example has a central recessed region 130 that is recessed inward into the structure of the base 26. The central recessed region 130 is sandwiched and oriented vertically between a pair of projecting regions 132 of the panel that are also oriented vertically. The projecting regions 132 project or protrude forward relative to the structure of the base 26. A channel 134 that is open to the bottom of the base 26 is created behind each of the projecting regions 132 of the upright base panel 128. In this example, each of the channels 134 is positioned within and beneath the base 26. Each of these channels 134 is sized and configured to slidably received therein one of the guide legs 54 of the foot 28 from the bottom side 122 of the base 26.

An outward exposed surface 140 of the recessed region 130 and outward exposed surfaces 142 of the projecting regions 132 on the base 26 form a front face of the upright base panel 128. As shown in FIG. 2, bottom edges 144 are scalloped on the upright base panel 128 for each of the projecting regions 132. A bottom edge 146 of the recessed region extends lower or further down on the upright base panel that the bottom edges 144. A rectangular protrusion 148 juts forward from the surface 140 on the recessed region 130 and is oriented generally vertically and centrally between the projection regions. A front surface of the protrusion 148 is thus positioned out of plane and further forward relative to the surface 140.

FIG. 2 also shows two sets 150 of vertically spaced apart openings 152a, 152b, and 152c (specifically referenced) on the front surface 140 of the recessed region 130. One set 150 of the openings 152 (generically referenced) is positioned on each side of the rectangular protrusion 148 in this example. As shown, three openings 152 are provided vertically spaced apart in each set 150. Each of these openings 152 is generally rectangular and is sized to receive one of the tabs 90 during use. Each of these openings has an upper edge 154 that performs a particular function during use as well. The front surface of the protrusion 148 has three indicia 156 provided thereon. In this example, the numbers 3, 2, and 1 are provided as the positional indicia for the foot 28. Each of the numbers or indicia corresponds to a respective one of the openings 152 in each set 150. The bottom opening 152a in each set corresponds to the number 1 position indicated on the protrusion 148. Likewise, the middle opening 152b corresponds to the number 2 position and the top opening 152c corresponds to the number 3 position for the foot.

In order to install the foot 28 on the base 26, the flexible leg 52 is positioned beneath the recessed region 130 in line with the exterior or outer side of the upright base panel 128. The two guide legs 54 are then slid upward into the channels 134 behind the upright base panel 128 and are hidden by the projecting regions 132 beneath the base 26. Thus, the flexible leg 52 is positioned in front of and essentially covers the recessed region 130 of the upright base panel 128 and the two guide legs 54 are positioned behind the upright base panel in this example. As shown in FIG. 6, the scalloped bottom edges 144 of the projecting regions 132 are contoured to allow the toe end 38 of the foot body 32 to project forward relative to the position of the upright base panel 128, even when in a fully retracted position with the bottom 32 aligned with the bottom side 120 of the base 26. Portions of the base panel 128 seat within the gaps 56 in the foot. Contact between bottom edges of the panel 128 with the foot at the bottom of the gaps 56 can be used to limit upward travel of the foot. The projecting portions 132 surround the recessed section 130 and create a channel into which the flexible leg 52 seats. This can eliminate protruding components on the front of the base assembly.

Figure 7:
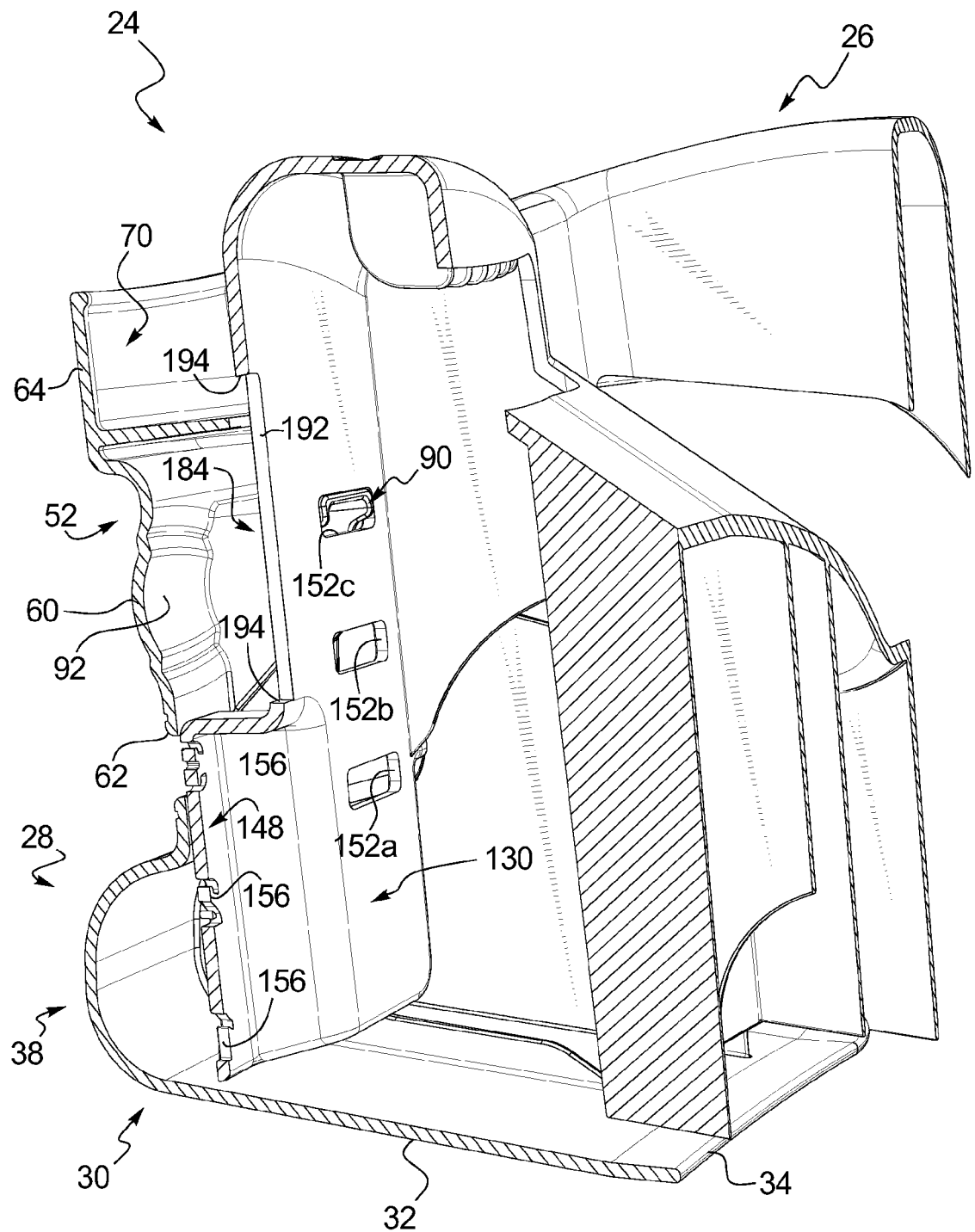
FIG. 7 shows a fragmentary cross-section of a portion of the base assembly taken along line VII-VII in FIG. 6.

Once inserted, the one-piece foot 28 is ready for use. The foot 28 can be slid generally vertically or upward and downward relative to the base 26 to adjust the foot position. In FIGS. 6 and 7, the foot 28 is positioned in its uppermost retracted position indicated by the position 3 indicia. In this position, the bottom 32 lies at least flush with the bottom side 120 of the base 26 such that the base can lie fully on its bottom side. The window 62 on the flexible leg 52 is aligned with the positional indicia 156 so that the selected positional indicator is visible from the front or one end of the base 26. As shown in FIG. 7, each tab 90 is seated in the uppermost opening 152c in their respective set 150 of the openings. The stop surface 98 of each tab 90 bears against the upper edge 154 in the corresponding opening.

Figure 9:
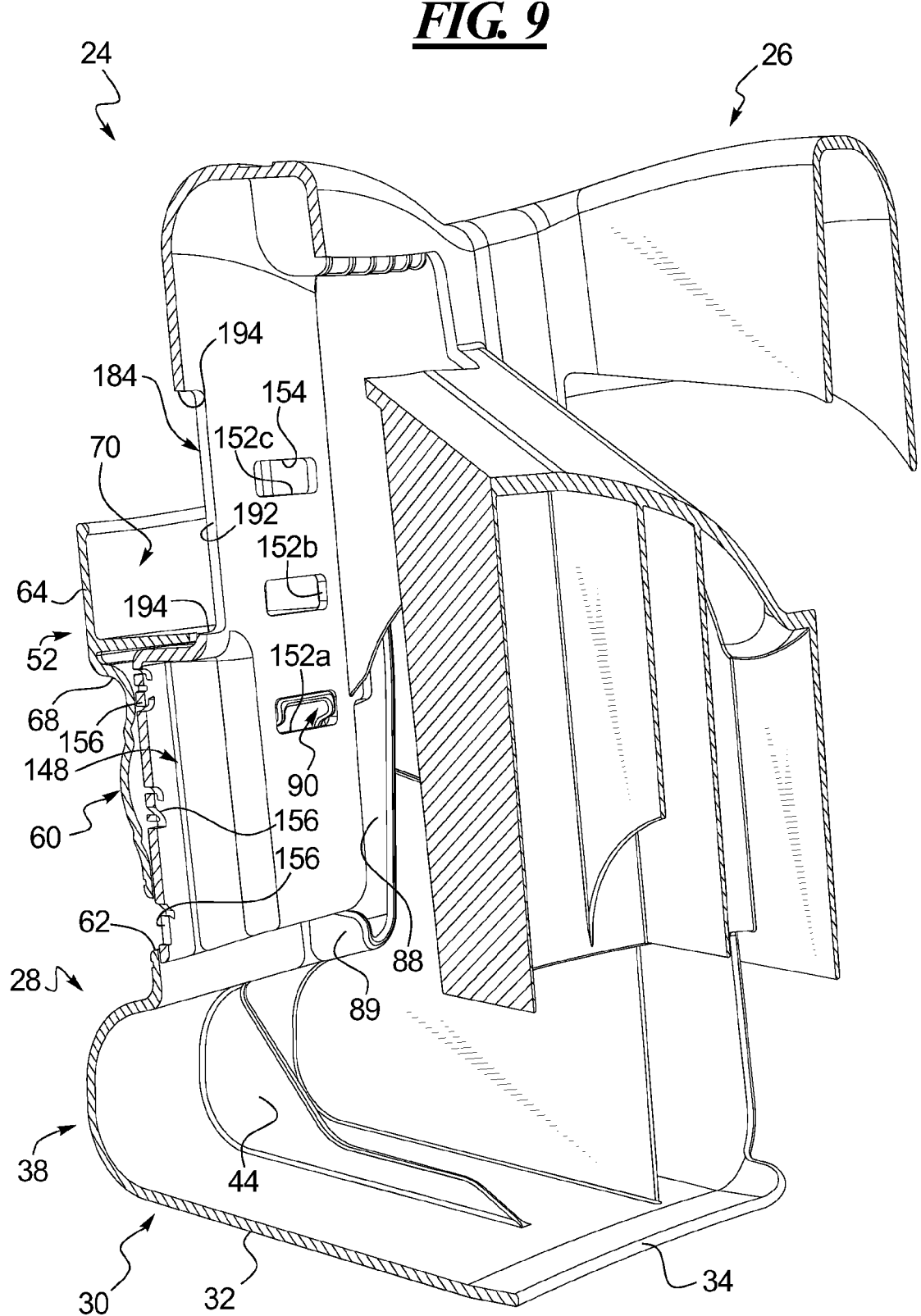
FIG. 9 shows a fragmentary-cross section of a portion of the base assembly taken along line IX-IX in FIG. 8.
Figure 13:
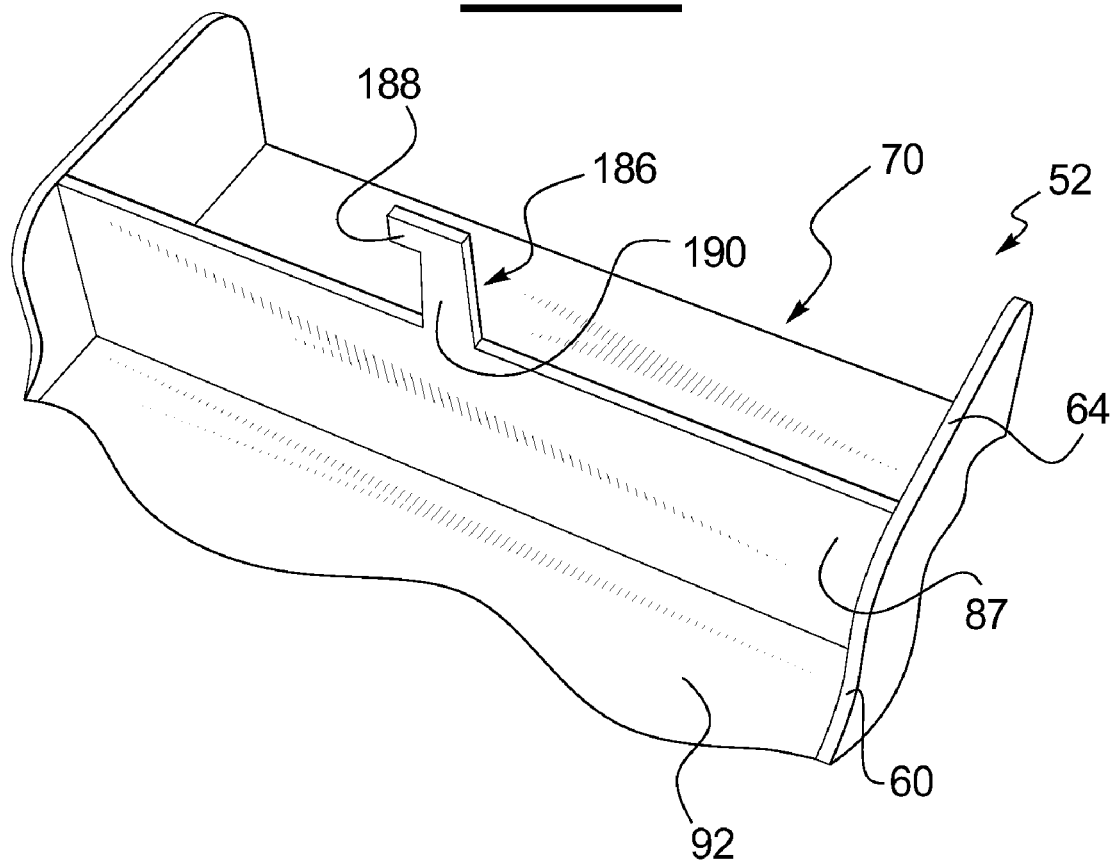
FIG. 13 shows a close-up perspective view of a stop finger carried on the back side of the foot shown in FIG. 4.
Figure 14:
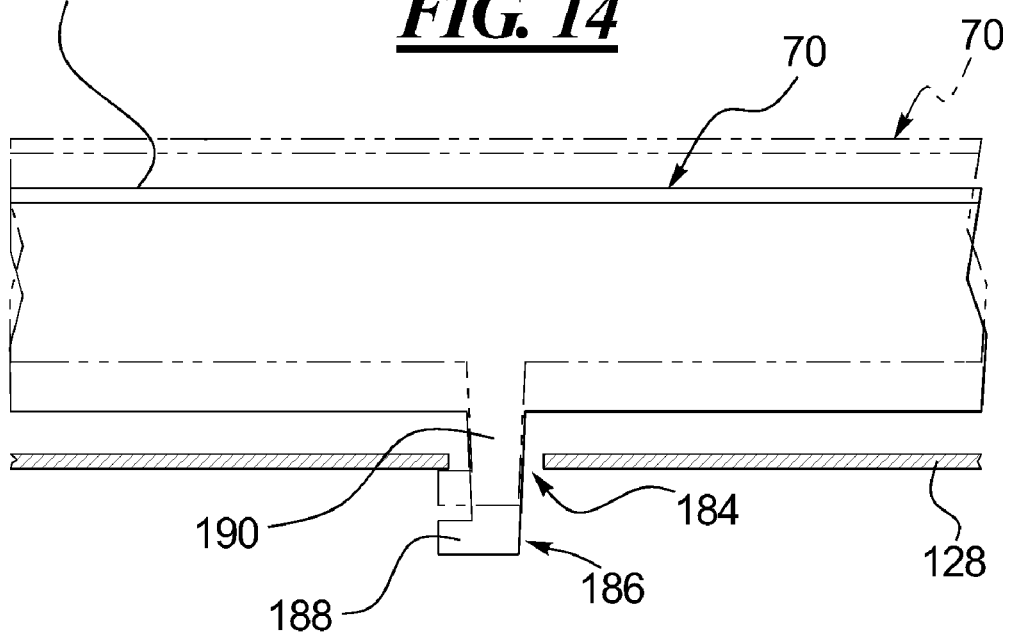
FIG. 14 shows a top cross-section view of the stop finger shown in FIG. 13 and received in a slot in the base assembly in FIGS. 7-9.

In order to adjust the position of the foot 28, a user simply places their fingers behind the handle 70 on the flexible leg 52, i.e., between the upper panel section 64 and the front surface 140 on the recessed region 130 on the upright base panel 128. The user can then pull the flexible leg away from the surface 140 sufficient to withdraw the tabs 90 from the openings 152c. With the tabs 90 withdrawn, the foot 28 is free to slide up or down, in this case only down to either the number 2 or number 1 foot position. FIGS. 7 and 9 show the foot 28 in the number 1 foot position with the number 1 indicator showing through the window 62 and with the foot 28 downwardly extended to its fully extended position (as in FIG. 1). In this example, the tabs 90 are seated in their respective lowermost openings 152a in each set 150, but otherwise function in the same manner as described above. Though not shown herein, a user can also select the number 2 position by seating the tabs 90 in the openings 152b.

FIG. 10 shows a close-up sectional view of one of the tabs 90 seated in one of the openings 152 on the base assembly depicted in FIGS. 6 and 7. FIG. 10 also shows the handle and flexible leg 52 in a bent outward position in phantom, which would release the tab 90 from the opening 152 for adjusting the foot position. In this example, the opening 152 is sized to receive only a tip portion 160 of the tab 90 seated in the opening 152. The free edge 100 of the vertical portions 98 on the tabs 90 can be contoured to create the desired size and shape tip portion 160 to fit in the opening 152. Alternatively, the tip and/or the opening can be sized and shaped to permit a substantial portion of the tab to seat in the opening. The remainder of the vertical portions can be shaped to adequately withstand the expected loads applied during use. The weight on the base 26 will bear downward through the upper edge 154 of the openings and be applied onto the stop surfaces 98 on the tabs 90. The configuration of the surfaces should be sufficient to prevent the tabs from being inadvertently dislodged so that the foot does not inadvertently move. If someone or something were to inadvertently push on the flexible tabbed 52, the tabs 90 in this example would be pushed further into the respective openings instead of being withdrawn, thus ensuring that the foot 28 remains latch and secured in place.

Detents, bumps, nubs, curved ends, protrusions, or the like can be employed on the stop surfaces 98 (or partly on the upper edge 154 of the openings) to assist in retaining the tabs seated in the openings. In an alternative example, the openings 152 can be appropriately sized and shaped, and the free edges 100 on the tabs 90 can be shaped to provide ramps. The ramps can be configured so as to permit a user to pull the foot downward without having to manually flex the leg 52 via the handle 70. Instead, the ramps will force the tabs out of the openings 152 via contact with the lower edges of the openings as the foot is drawn downward. The tabs would still prevent this ramp function in the foot upward direction, which still must support the base during use.

Though not shown herein, the ICS product 20 can be placed on a vehicle seat within the foot 28 in a fully upward retracted position. This can be done where no leveling of the product is necessary for safe and comfortable installation in a vehicle. However, not all vehicle seats are alike and sometimes, leveling of the ICS product 20 is required. FIG. 11 shows a side view of the product 20 installed on a vehicle seat 170. In this example, the foot 28 is downwardly extended to the number 1 position described above in order to level the base 26 with a vehicle seat bottom 172. As shown, the front end or one end of the base 26 to which the foot 28 is attached faces a seat back 174 of the vehicle seat 170. The foot 28 helps to level the product 20. Also, the configuration and construction of the foot disclosed and described herein will prevent the foot from inadvertently being released and retracted by contact with the seat back 174. As is known in the art, the vehicle slap belt 176 can be used to secure the product 20 on the seat 170.

FIG. 12 shows a different vehicle seat 180 with a seat bottom 182 having a different angle or contour than the vehicle seat 170. In this example, the ICS product 20 is depicted as installed on the vehicle seat with the foot 28 in the number 2 foot position. In either case, the bottom 32 of the foot in the disclosed example has a relatively large footprint. This can create stability during use, if the foot must be deployed from the retracted position, as in the positions in FIGS. 11 and 12. In the retracted position, the base can rest in a very stable manner on its bottom side, if the vehicle seat is so oriented.

In one example, the disclosed base assembly can employ a stop mechanism as depicted in FIGS. 4, 8, 13 and 14. The stop mechanism can be utilized to limit foot travel in both directions. The stop mechanism can resist removal of the foot 28 from the base 26, once the foot is attached. The stop can also limit outward travel of the handle 70 to reduce stress on the flexible leg 52. In this example, the stop mechanism is capable of performing all three functions. The stop mechanism has a slot 184 formed in the upright base panel 128 between the two sets of openings 150. The stop mechanism also has a shaped finger 186 captured in the slot when the foot is attached.

The finger 186 is integrally formed projecting rearward from the back side 92 of the flexible leg 52 near the transition 68. The finger has a flat, wide profile and a hooked end 188 that hooks to one side in this example. The finger also has an elongate shaft 190 between the back side 92 and the hooked end 188. The slot 184 has a vertical length and a narrower width defined by opposed side edges 192 and opposed top and bottom ends that create stop surfaces 194. The length of the slot 184 can be such that the finger 186 contacts one of the opposed stop surfaces 194 if the foot 28 is moved up beyond the top foot position in a direction away from the bottom position of the foot 28. The finger can also contact the other stop surface 194 if the foot is moved down beyond the bottom foot position in a direction away from the top position. The stop mechanism can thus prevent the foot from inadvertently coming off the base 26.

The length of the shaft 190 and the size of the hook end 188 can be configured so that the hook end catches on the upright base panel 128 adjacent the slot 184 if the handle 70 is pulled outward too far. This can reduce stress on the bend region in the flexible leg 52 near the ledge 78. The size of the hook end 188 and the width of the slot 184 can also be configured as a one-way snap structure to prevent a user for easily removing the foot from the base, even if that is their intention.

Figure 15:
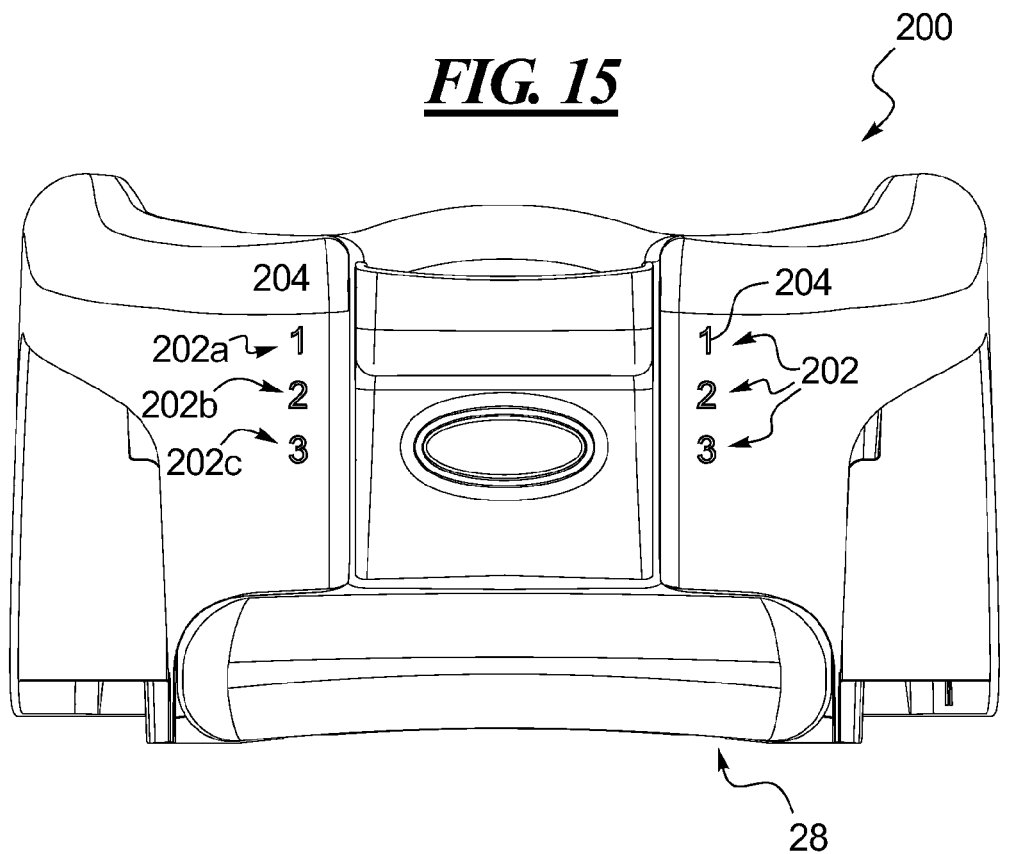
FIG. 15 shows a front view of a base assembly with the adjustable foot in the retracted position similar to that in FIG. 6, but with an alternate example of a position indicator.
Figure 16:
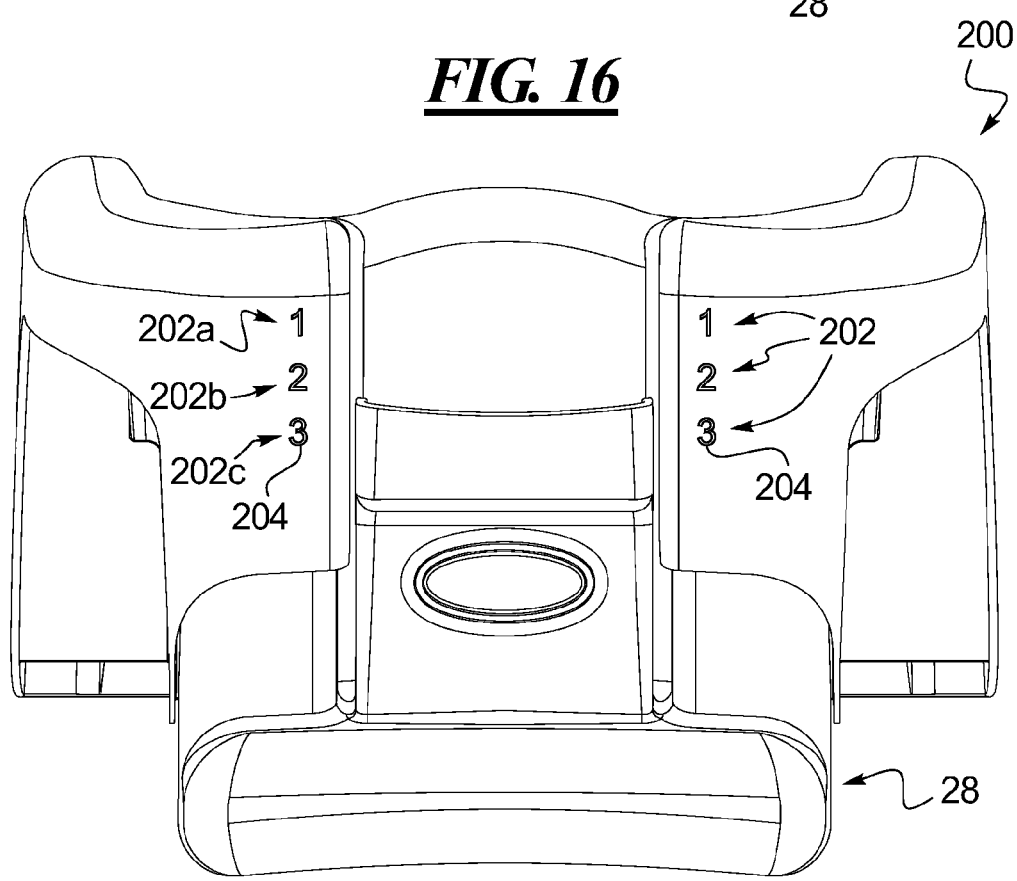
FIG. 16 shows a front view of the base assembly in FIG. 15, but with the adjustable foot in the extended position.

FIGS. 15 and 16 show an alternative example of a base assembly 200. The foot 28 and the upright base wall 128 on the base 200 are configured to create a different positional indicator. In this example, a vertical array of windows 202a, 202b, 202c are formed through the front surface 142 on the projecting portions 132 instead of on the flexible leg as in the prior embodiment. Each of the windows 202 in this example coincides with one of the foot positions and is shaped to represent the appropriate numerical representation of the position. In this example, an indicator or flag 204 of some type can be provided on the guide legs 54, or at least one of the guide legs as only one array of windows could also be used. The indicator or flag 204 is visible through the appropriate window that corresponds to the selected foot position.

In FIG. 15, the foot 28 is in the fully retracted position indicated by the number 1 indicia 202a. The flag 204 is visible in the number 1 window as indicated by the darkened numeral. In FIG. 16, the foot 28 is in the fully extended position and the flag or is visible in the number 3 window. In the earlier embodiment, the numbers and positions were reversed, thus indicating that the positional representations and the corresponding indicia can vary.

Figure 17:
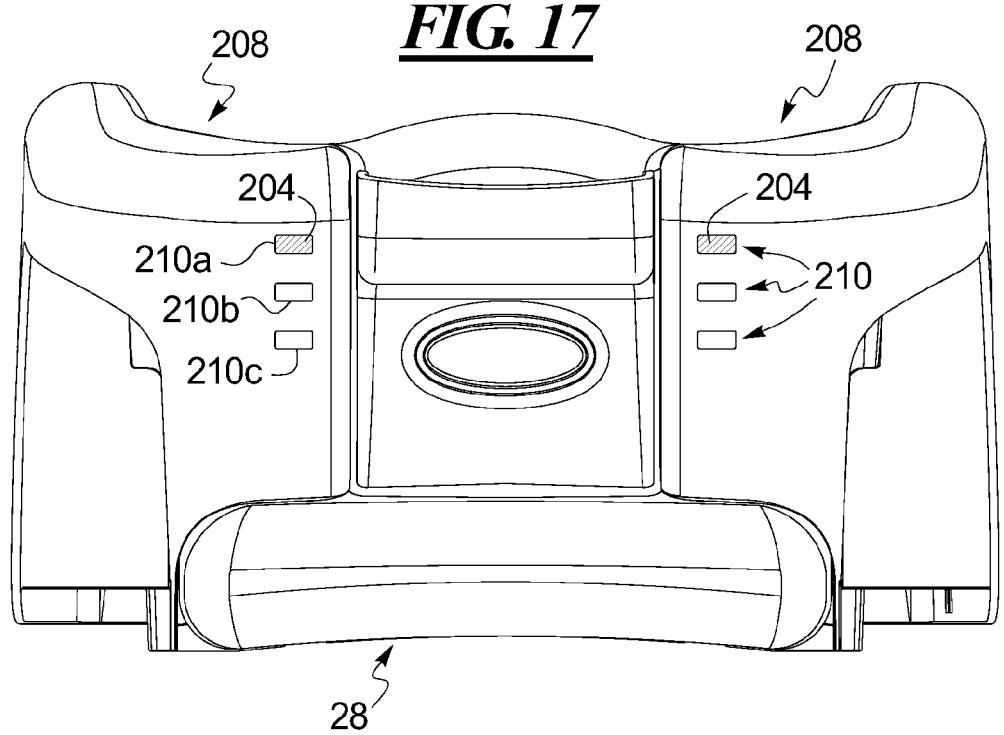
FIG. 17 shows a front view of a base assembly with the adjustable foot in the retracted position similar to that in FIG. 6, but with another alternate example of a position indicator.
Figure 18:
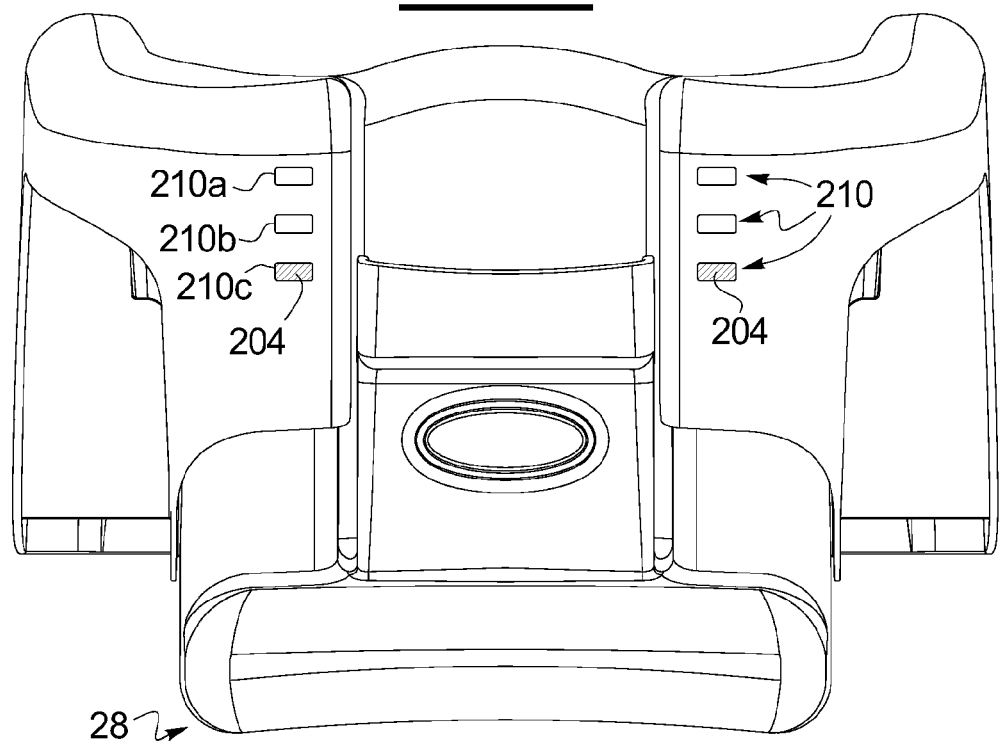
FIG. 18 shows a front view of the base assembly in FIG. 17, but with the adjustable foot in the extended position.

FIGS. 17 and 18 show another alternate seat base 208 with different window configurations. The indicators on this base 206 are otherwise similar to those on the base 200 depicted in FIGS. 15 and 16. In this example, each of the windows 210a, 210b, and 210c is a rectangular opening through the front surface 142 on each of the projecting portions 132. The flag 204 is visible in the top position window 210a in FIG. 17 representing the fully retracted foot position in this example. The flag 204 is visible in the lower position window 210c in FIG. 18 representing the fully extended foot position in this example.

As used herein, the terms front, back, top, bottom, side, vertical, horizontal, upright, and the like are used for general reference only. These terms are used to relate various components of the disclosed seat base assembly to other components and are not otherwise intended to limit the scope of the invention to a specific position or orientation. For example, the term upright base panel is not intended to require that the panel be perfectly vertical or upright in comparison to a vertical or horizontal reference. Instead, the term is used to relate the upright base panel to other components. With reference to FIG. 5, it is clear that the portions of panel 128 are not perfectly vertical and are instead oriented at an angle offset from a vertical reference. The foot 28 will still generally slide up and down relative to the seat base and relative to a normal orientation of the seat base during use.

The configuration and arrangement of the tabs 90 and openings 152 can vary within the spirit and scope of the present invention. The tabs and openings need not be shaped exactly as disclosed and described herein. In addition, the number of openings defining a number of positions can very as well from two to any desirable number. The disclosed example utilizes three positions and thus three openings for same. Only one set of openings need be provided as well, or more than two sets can be used. Further, the configuration and construction of the stop finger and slot can vary. The slot can be provided on the foot and the tab can be provided on the base, if desired. The finger can employ two adjacent, flexible fingers that can be squeezed together to install the fingers in the slot or to remove them. Once in the slot, the flexible fingers can spread apart to maintain engagement with the slot.

Although certain infant car seat base assemblies have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A base assembly for an infant car seat, the base assembly comprising:
    a base section having a top side, a bottom side, a first end, an upright base panel on the first end, and first and second openings vertically spaced apart on the upright base panel; and
    a foot attached to the first end and slidable along the upright base panel in a direction generally normal to a plane of the bottom side between a first position and a second position, the foot having
        a foot body,
        a resilient, flexible leg extending up from the foot body, the flexible leg being exposed on an exterior of the base section and covering part of a front facing surface of the upright base panel and having a back side facing the upright base panel,
        a guide leg extending up from the foot body adjacent the flexible leg and positioned behind the upright base panel, and
        a tab protruding from the back side of the flexible leg and sized to selectively seat in each of the first and second openings,
    wherein the flexible leg biases the tab toward the upright base panel to seat in a selected one of the first and second openings when aligned with the selected opening, and wherein the flexible leg can be bent outward away from the upright base panel to permit sliding the foot to one of the first or second positions.

2. A base assembly according to claim 1, further comprising:
    a handle positioned at an upper end of the flexible leg and having a finger access between the upright base panel and the flexible leg.

3. A base assembly according to claim 2, wherein the flexible leg has a front panel joined to the foot body, a top edge, and an upper panel section extending up from the front panel and terminating at the top edge, the upper panel section arranged out of plane with the front panel further from the upright base panel, the finger access provided between the upright base panel and the upper panel section.

4. A base assembly according to claim 3, further comprising a pair of standoffs projecting rearward from side edges of the upper panel section toward the upright base panel.

5. A base assembly according to claim 1, wherein the tab further comprises a pair of tabs laterally spaced apart from one another on the flexible leg.

6. A base assembly according to claim 5, further comprising two sets of the first and second openings, the two sets laterally spaced apart from one another on the upright base panel, each of the two sets positioned to receive a respective one of the pair of tabs.

7. A base assembly according to claim 1, further comprising one or more additional openings vertically spaced apart between the first and second openings.

8. A base assembly according to claim 1, wherein the guide leg further comprises two guide legs, one of the two guide legs positioned on each side of the flexible leg, respectively; and
    a gap between each of the two guide legs and the flexible leg.

9. A base assembly according to claim 8, wherein a portion of the upright base panel is positioned behind the flexible leg, wherein a portion of the upright base panel is positioned within each gap, and wherein a portion of the upright base panel is positioned in front of each of the two guide legs.

10. A base assembly according to claim 1, wherein the guide leg further comprises two of the guide legs, one of the two guide legs positioned on each side of the flexible leg; and two upwardly open channels positioned behind the upright base panel, each sized to receive one of the two guide legs.

11. A base assembly according to claim 1, further comprising:
a window formed through the flexible leg; and
indicia provided on the upright base panel corresponding to each of the first and second openings, the indicia for one of the first and second openings being visible through the window when the tab is seated in the corresponding opening.

12. A base assembly according to claim 1, wherein the tab has a stop surface that faces upward and bears against an edge of a selected one of the first and second openings when seated therein, and wherein the tab has a ramped surface facing in a direction opposite the stop surface.

13. A base assembly according to claim 1, wherein the upright base panel is a front wall on a front end of the base section.

14. A base assembly according to claim 13, wherein the guide leg is disposed behind the front wall beneath the base section.

15. A base assembly according to claim 1, further comprising:
a slot on one or the other of the base section and the foot and having a length and opposed stop surfaces; and
a stop finger projecting from the other of the base section and the foot, the stop finger captured in and slidable along the slot,
wherein the stop finger contacts one of the opposed stop surfaces if the foot is moved beyond the first position in a direction away from the second position and contacting the other of the opposed stop surfaces if the foot is moved beyond the second position in a direction away from the first position.

16. An infant car seat product comprising:
a base having a top side, a bottom side, an upright base wall on one end of the base, and two openings vertically spaced apart on the upright base wall,
an infant car seat detachably mountable to the top side of the base; and
a foot slidable up and down along the upright base wall between two positions, the foot having
a foot body,
a resilient, flexible leg integral with and extending up from the foot body and exposed on an exterior of the base of and covering a part of an outside surface of the upright base wall, the flexible leg having an upper edge spaced from the upright base wall,
a first guide leg integral with and extending up from the foot body adjacent the flexible leg and positioned behind and covering a part of an inside surface of the upright base wall, and
a first tab protruding from the flexible leg, the first tab sized to selectively seat in each of the two openings and having a stop surface,
wherein the flexible leg normally seats the first tab in a selected one of the two openings when the first tab is aligned therewith, wherein the stop surface bears against an edge of the selected opening when seated therein and prevents upward sliding of the foot, and wherein the upper edge of the flexible leg can be pulled away from the upright base wall to unseat the first tab and permit sliding the foot to either of the two positions.

17. An infant car seat product according to claim 16, wherein the first tab has a ramped surface facing in a direction opposite the stop surface, the ramped surface permitting downward sliding of the foot without manually pulling on the upper edge of the flexible leg.

18. An infant car seat product according to claim 16, further comprising:
a second tab; and
two laterally spaced apart sets of the two openings, wherein the first tab and second tab are positioned to align with one set of the two openings, respectively.

19. An infant car seat product according to claim 16, further comprising:
one or more additional openings vertically spaced apart between the two openings on the upright base wall, each of the openings corresponding to a different foot position.

20. An infant car seat product according to claim 16, further comprising:
a second guide leg, wherein one of the first and second guide legs is positioned on each side of and spaced from the flexible leg, respectively; and
a pair of upwardly open channels positioned behind the upright base wall, each channel sized to slidably receive one of the first and second guide legs.

\* \* \* \* \*